United States Patent
Ebert

(10) Patent No.: US 9,416,674 B1
(45) Date of Patent: Aug. 16, 2016

(54) FLOATING AIR RIDING SEAL FOR A TURBINE

(71) Applicant: Todd A Ebert, North Palm Beach, FL (US)

(72) Inventor: Todd A Ebert, North Palm Beach, FL (US)

(73) Assignee: S&J DESIGN LLC, Jupiter, FL (US)

( * ) Notice: Subject to any disclaimer, the term of this patent is extended or adjusted under 35 U.S.C. 154(b) by 463 days.

(21) Appl. No.: 14/066,364

(22) Filed: Oct. 29, 2013

Related U.S. Application Data

(60) Provisional application No. 61/818,492, filed on May 2, 2013.

(51) Int. Cl.
*F01D 11/00* (2006.01)
*F01D 11/02* (2006.01)

(52) U.S. Cl.
CPC .............. *F01D 11/001* (2013.01); *F01D 11/02* (2013.01)

(58) Field of Classification Search
CPC ................................ F04C 27/00; F01D 11/001
See application file for complete search history.

(56) References Cited

U.S. PATENT DOCUMENTS

| | | | | | |
|---|---|---|---|---|---|
| 3,383,033 | A | * | 5/1968 | Moore | F01D 11/001 415/111 |
| 4,123,666 | A | * | 10/1978 | Miller | F01D 15/10 290/52 |
| 4,178,129 | A | * | 12/1979 | Jenkinson | F01D 5/081 416/193 A |
| 7,870,742 | B2 | * | 1/2011 | Lee | F01D 5/082 60/782 |
| 8,066,473 | B1 | * | 11/2011 | Aho, Jr. | F01D 5/081 415/112 |
| 2009/0166988 | A1 | * | 7/2009 | Irmisch | F01D 9/023 277/650 |
| 2011/0274536 | A1 | * | 11/2011 | Inomata | F01D 5/082 415/178 |
| 2012/0082563 | A1 | * | 4/2012 | Wilson, Jr. | F01D 5/187 416/97 R |
| 2013/0136583 | A1 | * | 5/2013 | Colombo | F01D 11/003 415/173.2 |

* cited by examiner

*Primary Examiner* — Craig Kim
*Assistant Examiner* — Brian O Peters
(74) *Attorney, Agent, or Firm* — John Ryznic

(57) ABSTRACT

A floating air riding seal for a gas turbine engine with a rotor and a stator, an annular piston chamber with an axial moveable annular piston assembly within the annular piston chamber formed in the stator, an annular cavity formed on the annular piston assembly that faces a seal surface on the rotor, where the axial moveable annular piston includes an inlet scoop on a side opposite to the annular cavity that scoops up the swirling cooling air and directs the cooling air to the annular cavity to form an air cushion with the seal surface of the rotor.

7 Claims, 4 Drawing Sheets

FLOATING AIR RIDING SEAL FOR A TURBINE

CROSS-REFERENCE TO RELATED APPLICATIONS

This application claims the benefit to a Provisional Application 61/818,492 filed on May 2, 2013 and entitled FLOATING AIR RIDING SEAL FOR A TURBINE.

GOVERNMENT LICENSE RIGHTS

This invention was made with Government support under contract number DE-SC0008218 awarded by Department of Energy. The Government has certain rights in the invention.

BACKGROUND OF THE INVENTION

1. Field of the Invention

The present invention relates generally to a gas turbine engine, and more specifically to a seal between a rotor and a stator in the gas turbine engine.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

One prior art seal used in a gas turbine engine is where the rotor disk includes a labyrinth seal having a number of knife edges that rotates near to a surface on the stationary casing to form a rotary seal. The knife edge seal limits the leakage of flow but does not totally block the leakage. Brush seals are also used to reduce leakage. However, brush seals make contact with the rotating part and therefore cause wear of the brush bristles. Also, brush seals do not make good seals at high rotational speeds. One major problem with this type of rotary seal used in a gas turbine engine is that the gap formed between the rotary seal can vary depending upon the engine temperatures. During engine transients, the knife edges can actually rub against the stationary seal interface and thus cause heating or damaged to the knife edges. Some complex arrangement of parts have been proposed in the prior art to limit the seal gap in these types of rotary seals in gas turbine engines.

U.S. Pat. No. 8,066,473 issued to Aho, J R. on Nov. 29, 2011 and entitled FLOATING AIR SEAL FOR A TURBINE discloses an air riding seal with an annular piston that rides on a surface of a rotor disk in a gas turbine engine, the entire contents being incorporated herein by reference. A cushion of air is formed between the annular piston and the rotor surface. This seal provides for a great seal between the rotor and the stator of the turbine as long as the rotor surface remains true and perpendicular to the rotor axis. When the rotor disk starts to cone (when the disk surface bends away from the annular piston), the seal surface for the annular piston does not seat against the rotor surface.

BRIEF SUMMARY OF THE INVENTION

A floating air riding seal for a turbine, where the seal includes an annular piston formed in a stator of the turbine, where the annular piston includes an annular cavity supplied with pressurized air that forms an air cushion or air riding seal with a surface of an adjacent rotor. The annular piston includes a scoop on an inlet end that scoops up air swirling around in an adjacent rim cavity in which the air flows in a swirling direction due to rotation of the adjacent rotor. The swirling air is scooped up and directed to flow into the annular air chamber to form a cushion of air between the annular piston and the rotating rotor surface.

DETAILED DESCRIPTION OF THE INVENTION

The present invention is an improvement over the floating air seal in the Aho U.S. Pat. No. 8,066,473. The annular piston that forms the floating air seal in the Aho patent is a one piece piston, and thus does not produce an adequate seal when the rotor disk surface cones. Coning of the rotor disk is when the surface of the rotor disk is not normal to the rotational axis of the rotor. In the floating air riding seal of the present invention, the annular piston is a two-piece or split design annular piston that will maintain a good seal even when the rotor disk surface cones.

Figure 5:
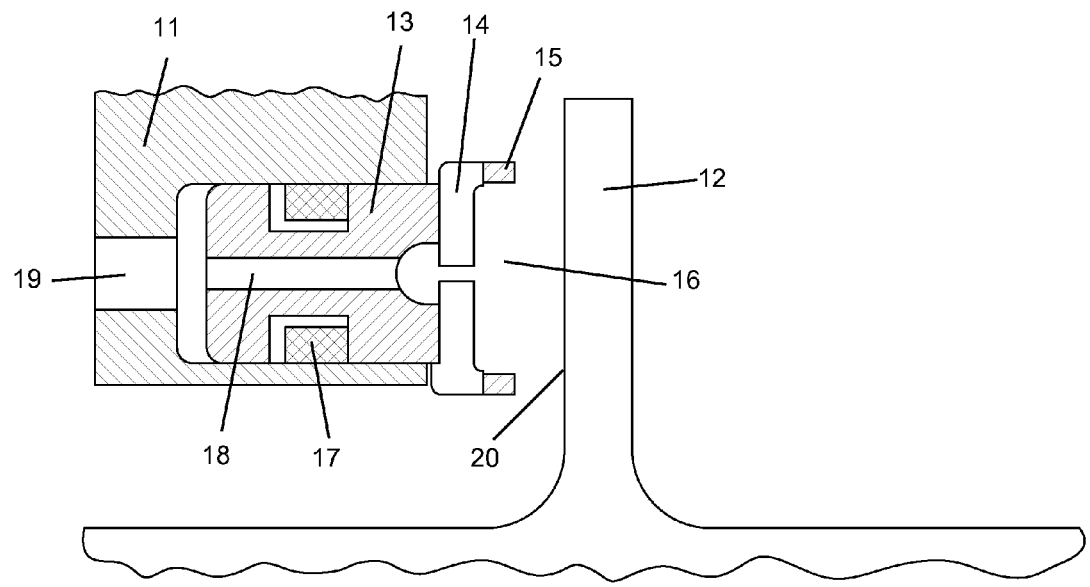
FIG. 5 shows a cross sectional view of a floating air riding seal without the scoop of the present invention with a rotor disk not coning.
Figure 6:
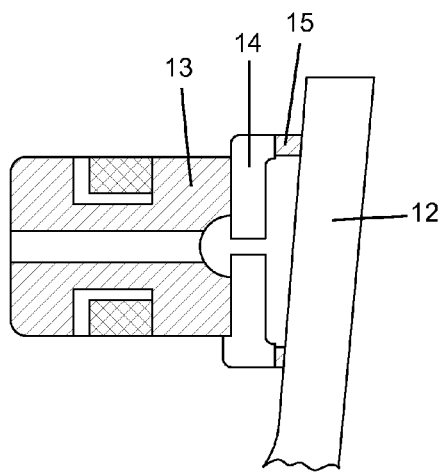
FIG. 6 shows a cross sectional view of the floating air riding seal without the inlet scoop of the present invention with a rotor disk coning.

FIG. 5 shows the floating air riding seal with a stator 11, a rotor 12, an annular piston assembly with an annular piston 13, an annular piston head 14 secured to the annular piston 13 that forms an annular air chamber 16 facing a sealing surface 20 of the rotor 12, two annular seals 17 to seal the annular piston 13 within an annular chamber of the stator 11, a central passageway 18 and a pressurized air supply channel 19. The annular piston head 14 includes a low porosity abradable tip 15 on the inner and outer sides that rub against the sealing surface 20 of the rotor 12 and wear to account for any coning of the rotor sealing surface 20. The low porosity abradable material could be felt metal or polyester aluminide or other materials of similar properties. FIG. 6 shows the rotor 12 having a sealing surface slanted from a perpendicular angle from the rotational axis that shows the coning of the rotor 12. The lower tip is more worn than the outer tip 15 due to the coning of the rotor sealing surface 20.

Figure 1:
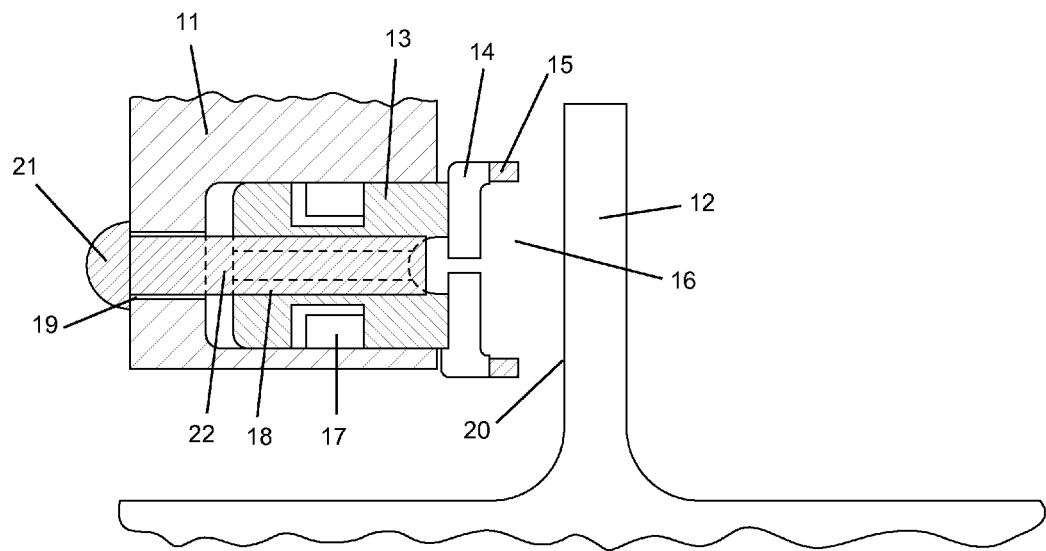
FIG. 1 shows a cross sectional view of a first embodiment of a floating air riding seal with a recessed inlet scoop of the present invention.
Figure 2:
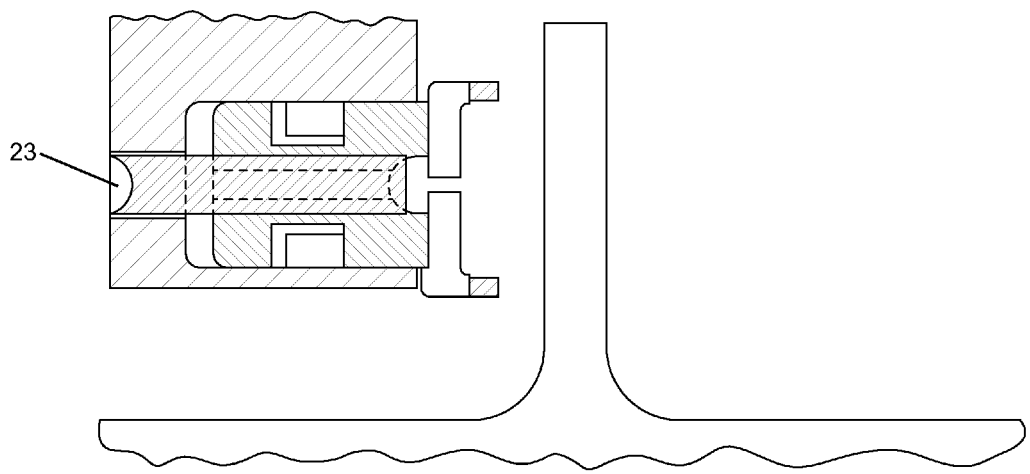
FIG. 2 shows a cross sectional view of a second embodiment of a floating air riding seal with a protruding inlet scoop of the present invention.
Figure 3:
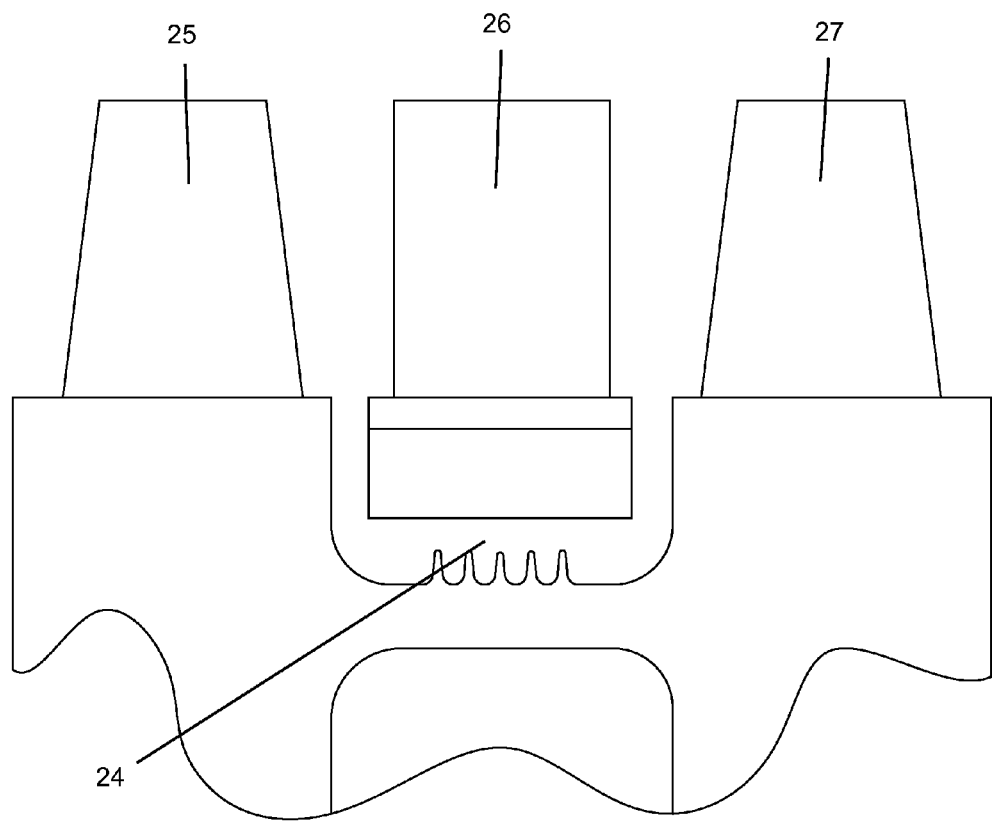
FIG. 3 shows a cross sectional view of a prior art compressor stator well with a labyrinth seal between the rotor and the stator.

FIG. 1 shows the air riding seal for a compressor or turbine in which a protruding inlet scoop 21 and a cylindrical tube 22 is inserted into the central passageway 18 of the annular piston 13 to channel air from the inlet scoop 21 to the annular air chamber 16. The annular piston 13 includes an annular arrangement of central passageways 18 that connect the air supply channel 19 to the annular air chamber 16. The inlet scoop 21 and cylindrical tube 22 moves axially along with the annular piston 13. The inlet scoop 21 and the cylindrical tube 22 both move relative to the air supply channel 19 and the stator 11. FIG. 2 shows that the inlet scoop 23 can be like a recessed scoop on a race car that directs air into a passage connected to the inlet scoop.

Figure 4:
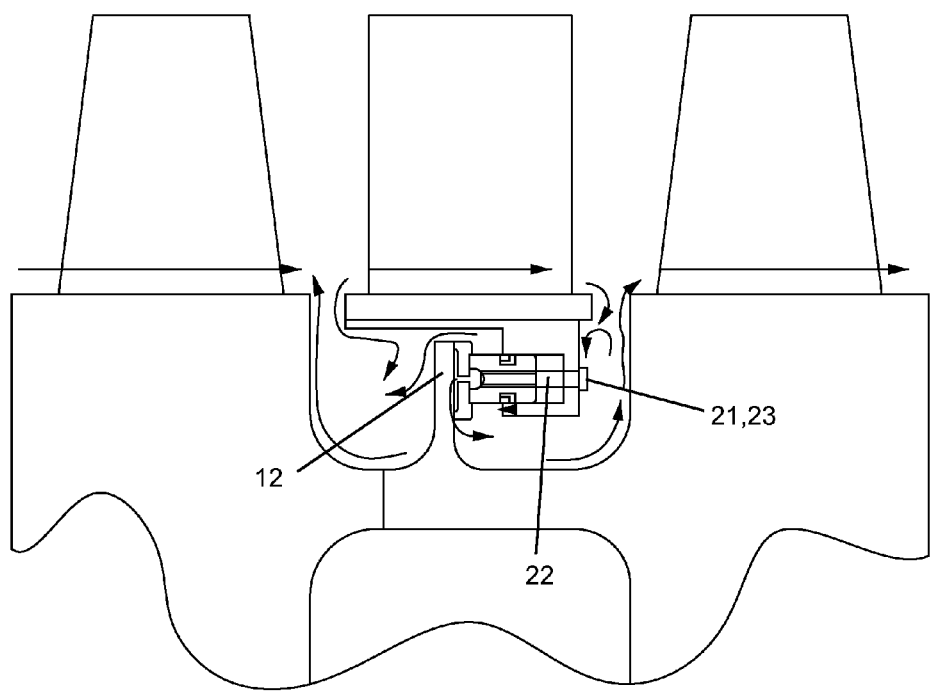
FIG. 4 shows a cross sectional view of a compressor stator well with the air riding seal and scoop of the present invention.

FIG. 4 shows the inlet scoop 21 or 23 and cylindrical tube 22 in the air riding seal of FIG. 5 within a compressor stator well to form a seal between the rotor and the stator. The rotor adjacent to the air riding seal will turn the air in a swirling motion. The swirling air is drawn into the inlet scoop 21 or 23 and then through the cylindrical tube 22 and into the annular air chamber 16 to form the seal between the stator 11 and the rotor 12. The arrows represent the path that the air will take.

In the rotor/stator cavity of the turbine, the tangential velocity of the air is between zero and the speed of the rotor. The tangential velocity causes the upstream total pressure to be higher than the static pressure. The protruding or recessed scoop is a passive way to use the cavity total pressure as the inlet driving pressure in cases where an external higher source of pressure cannot be piped into the seal such as compressor wells or turbine interstage seals without external source of air piped in. FIG. 4 shows arrows representing the flow of the air within the compressor stator well where the floating air riding seal is located. The floating air riding seal assembly is formed in the stator extending from the stator vane and into the rim cavity. The rotor rotates within the rim cavity and causes the air to swirl. The scoop thus scoops up the swirling air and forces the air to flow into the annular air chamber 16 to form the cushion of air for the rotor surface 20.

I claim the following:

1. An air riding seal formed between a rotor and a stator comprising:
   a stator having an annular chamber;
   a rotor with a seal forming surface;
   an annular piston axially moveable within the annular chamber of the stator;
   an annular air chamber formed on one end of the annular piston to form an air riding seal with the seal forming surface of the rotor;
   a central passageway formed within the annular piston with one end opening into the annular air chamber and an opposite end opening onto an opposite end of the annular piston;
   a cylindrical tube secured to the stator and extending through the central passageway of the annular piston; and,
   a scoop formed on an end of the cylindrical tube and shaped to scoop up swirling air on a side of the stator and pass the scooped up air through the cylindrical tube and into the annular air chamber to form a cushion of air on the seal forming surface of the rotor.

2. The air riding seal of claim 1, and further comprising:
   the inlet scoop is a protruding inlet scoop that protrudes beyond an opening of an air supply channel formed within the stator.

3. The air riding seal of claim 1, and further comprising:
   the inlet scoop is a recessed inlet scoop that is recessed beyond an opening of an air supply channel formed within the stator.

4. The air riding seal of claim 1, and further comprising:
   the scoop is fixed to an end of the cylindrical tube.

5. A turbine of a gas turbine engine comprising:
   a rotor and a stator forming a rim cavity;
   the stator having an annular piston axial moveable within an annular air chamber;
   the annular piston having an annular air chamber on one end that forms a seal with a surface of the rotor;
   a cylindrical tube fixed to the stator and extending through a central passageway of the annular piston to supply air to the annular air chamber of the annular piston;
   the annular piston is axial moveable with respect to the cylindrical tube; and,
   a scoop on an end of the cylindrical tube to scoop up swirling air produced by an adjacent rotor and pass the scooped up air through the cylindrical tube and into the annular air chamber to form an air cushion on the seal surface of the rotor.

6. The turbine of claim 5, and further comprising:
   the inlet scoop is a protruding inlet scoop that protrudes beyond an opening of an air supply channel formed within the stator.

7. The turbine of claim 5, and further comprising:
   the inlet scoop is a recessed inlet scoop that is recessed beyond an opening of an air supply channel formed within the stator.

* * * * *